United States Patent [19]

Powell

[11] Patent Number: 5,006,710

[45] Date of Patent: Apr. 9, 1991

[54] RECOGNITION AND PROCESSING OF WAVEFORMS

[75] Inventor: Brian D. Powell, Maidenhead, England

[73] Assignee: Detector Electronics Corporation, Minneapolis, Minn.

[21] Appl. No.: 420,271

[22] Filed: Oct. 12, 1989

[51] Int. Cl.[5] ............................................. G01J 5/02
[52] U.S. Cl. ................................... 250/340; 250/339; 340/578
[58] Field of Search ............... 250/339, 340; 340/577, 340/578

[56] References Cited

U.S. PATENT DOCUMENTS

| | | | |
|---|---|---|---|
| 3,940,753 | 2/1976 | Muller | 250/338.1 |
| 4,570,157 | 2/1986 | Kodaira | 340/567 |
| 4,603,255 | 7/1986 | Henry et al. | 250/339 |

FOREIGN PATENT DOCUMENTS

| | | |
|---|---|---|
| 2530848 | 2/1976 | Fed. Rep. of Germany . |
| 1279029 | 1/1970 | United Kingdom . |
| 1377683 | 12/1974 | United Kingdom . |
| 2007000 | 5/1979 | United Kingdom . |
| 2145864 | 4/1985 | United Kingdom . |

Primary Examiner—Constantine Hannaher
Assistant Examiner—Jacob M. Eisenberg
Attorney, Agent, or Firm—Paul L. Sjoquist

[57] ABSTRACT

A flame detector has a sensor for producing a digital waveform representing a flickering flame. Its turning points are detected and the magnitudes between successive such points are measured. The value of each such magnitude is plotted on a graph whose horizontal axis represents the current value and whose vertical axis represents the immediately preceding value. Points are produced lying in regions away from the diagonal and from the axes. If the detected waveform originates from a regularly varying interfering source, the corresponding points will lie on or near the diagonal. If the interfering source is a waveform undergoing step changes, the corresponding points will lie adjacent to the axes. In this way, discrimination between flames and interfering sources of radiation can be made.

7 Claims, 3 Drawing Sheets

RECOGNITION AND PROCESSING OF WAVEFORMS

BACKGROUND OF THE INVENTION

The invention relates to the detection of flames. Embodiments of the invention to be described have improved discrimination against sources of varying infra-red radiation which might be confused with infra-red radiation emitted by flames.

BRIEF SUMMARY OF THE INVENTION

According to the invention, there is provided a system for processing signals so as to discriminate in favor of certain types of signal and against other types, comprising means for measuring the changes in magnitude between successive turning points of the signal, comparing means for comparing each such magnitude change with the immediately preceding such magnitude change, and processing means responsive to the successive comparisons to discriminate against those produced when the signal is substantially regularly varying or includes changes which are substantially of step form, and in favor of those corresponding to a substantially randomly varying signal.

According to the invention, there is also provided a method of discriminating in favor of infra-red radiation from flames and against infra-red radiation from interfering sources, comprising the steps of producing signals varying in correspondence with the radiation, detecting the turning points of the signals, measuring the change in signal magnitude between successive turning points whereby to produce a series of magnitude change signals, simulating the spatial representation of successive points on a graph having two orthogonal axes each of which is scaled with values increasing from zero for the magnitude changes with one of the axes representing each currently considered magnitude change and the other of them representing the corresponding immediately preceding magnitude change so that each point on the graph represents a plot of a particular one of the magnitude changes as compared with the immediately preceding one thereof, whereby points on the graph corresponding to substantially regularly varying signals lie within a predetermined region extending from the origin and inclined to each said axis, points on the graph corresponding to changes which are substantially of step form in the signals lie within either of two regions extending closely adjacent the respective axes, and points corresponding to substantially randomly varying signals tend to lie outside all the regions, and including the step of determining the proportion of the points which lie outside the said regions whereby to produce an output signal indicating detection of radiation from flames when the proportion exceeds a predetermined threshold.

DESCRIPTION OF THE DRAWINGS

Flame detection apparatus embodying the invention will now be described, by way of example only, with reference to the accompanying diagrammatic drawings in which.

DESCRIPTION OF PREFERRED EMBODIMENTS

Figure 1:
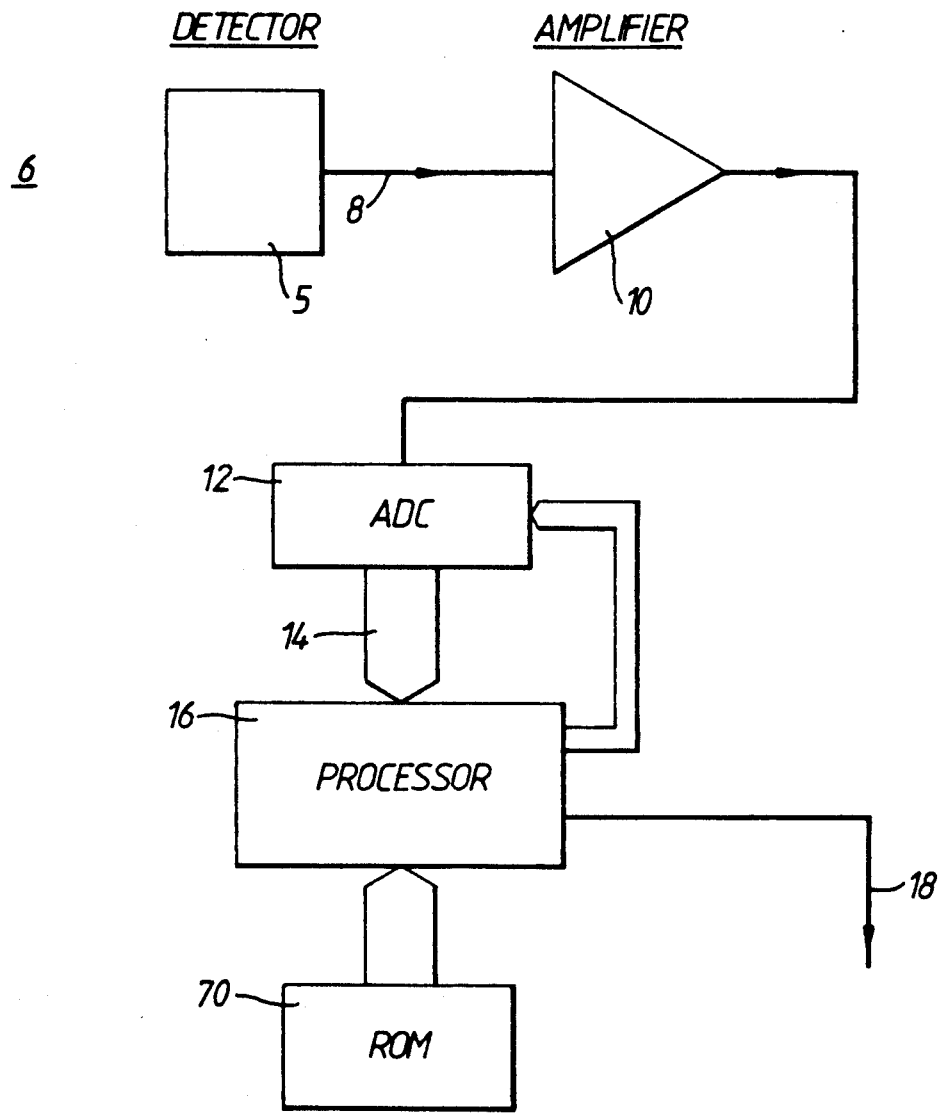
FIG. 1 is a block diagram of the apparatus.

As shown in FIG. 1, the apparatus includes an infra-red radiation detector 5, such as a pyroelectric detector, which is arranged to view the area 6 in which flames to be detected are expected to arise. The detector 5 may view the area 6 through a suitable radiation filter if required. In a specific example being considered, the detector is arranged to be responsive to infra-red radiation at about 4.3 micrometers, and produces a corresponding electrical signal on a line 8 which is amplified in an amplifier 10 and passed to an analog to digital converter 12. The resultant digital signal on channel 14, representing the varying radiation produced by the flickering flame, is passed to a processing unit 16 for analysis in the manner to be described. An output line 18 produces a warning signal if the processing unit 16 determines that the signal on line 14 represents a flame. If the processing unit 16 determines that the signal on line 14 represents a non-flame source of infra-red radiation no warning signal is produced on line 18.

In the manner to be described, the apparatus is able to discriminate against such non-flame sources of varying infra-red radiation as incandescent lamps, moving or vibrating hot surfaces or other sources of infra-red radiation such as sunlight modulated by the passage of a moving body or bodies through its path to the detector.

Figure 2:
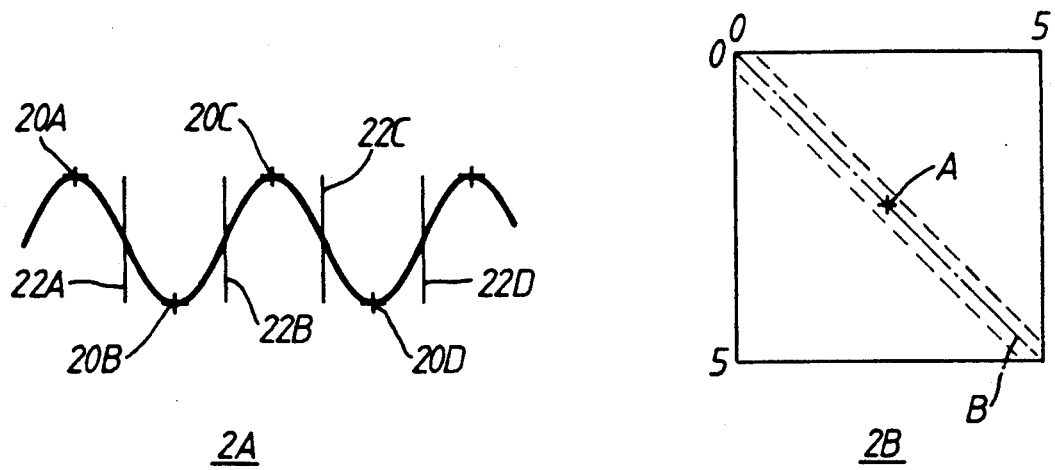
FIGS. 2, 3 and 4 show waveforms and associated graphs for explaining the operation of the apparatus of FIG. 1.
Figure 3:
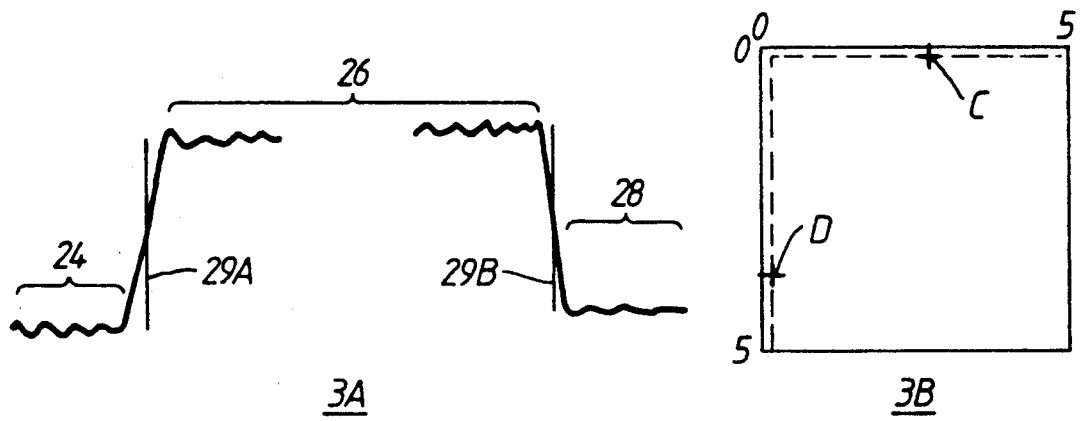
Figure 4:
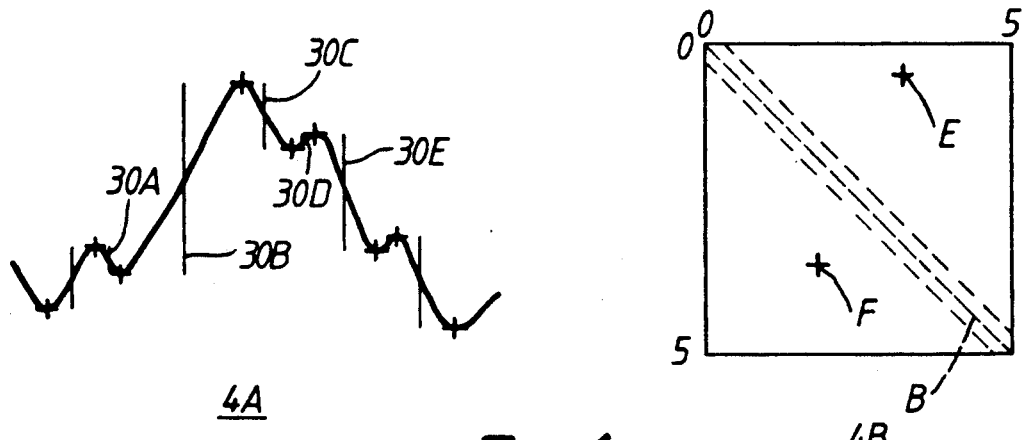

FIGS. 2, 3 and 4 explain the operation of the apparatus.

FIG. 2 illustrates at 2A the waveform (somewhat idealised) of the signal likely to be produced on line 14 (FIG. 1) in response to a regularly varying source of infra-red radiation such as a modulated incandescent lamp. As shown, the waveform 20 is substantially a regular sine wave. In the processing unit 16, each positive and negative peak 20A, 20B, 20C... is detected, and the processing unit measures the change in magnitude between each peak value and the immediately preceding peak value so as to produce a succession of "magnitude change" signals. These magnitude change signals are represented in FIG. 2A by the vertical lines 22A, 22B, 22C.... In view of the regular form of the waveform shown in FIG. 2A, each of these magnitude change values will be approximately the same. In the manner to be described in more detail, the processing unit 16 analyses the magnitude change signals by comparing the value of each one with the previous one.

FIG. 2B shows in diagrammatic form the processing carried out. In FIG. 2B, the horizontal axis from the origin 0/0 has an arbitrary scale of 0 to 5 and represents the value of each magnitude change signal being considered. The vertical axis downwards from the origin 0/0 is calibrated to the same arbitrary scale and represents the value of the immediately preceding magnitude change signal. Therefore, considering the magnitude change signals 22A and 22B (FIG. 2A), point A on FIG. 2B represents the comparison between them in graphical fashion; thus, point A represents the point corresponding to the intersection of the value of the magnitude change signal 22B plotted on the horizontal axis and the value of the magnitude change signal 22A plotted on the vertical axis.

The regular nature of the waveform of FIG. 2A is such that the corresponding plot on FIG. 2B for the comparison of the magnitude change signal 22C with the magnitude change signal 22B will also be at point A. As long as the amplitude of the waveform shown in FIG. 2A remains the same, all plots will be at point A. If the amplitude of the waveform is different, but still regular, the plots on FIG. 2B will be differently positioned, but will always be on the diagonal line shown chain-dotted at B.

FIG. 3A shows the waveform represented by the digital signal on line 14 (FIG. 1) for the case where the infra-red radiation being received is from a source which is randomly switched on and off or interrupted. For example, the waveform at region 24 could represent low background radiation. A source of radiation is then suddenly switched on and the level rises to that shown at region 26. This radiation continues and is then abruptly switched off and the detected radiation once more reduces to the background level as shown at region 28. Instead, for example, the radiation in region 26 could be radiation from a hot surface which is interrupted or blocked from the detector over regions 24 and 28.

The waveform shown in FIG. 3A is processed in the processor 16 in the same way as described above. The processing unit senses the positive and negative peaks and measures the magnitude change between the successive peaks. The value of each such magnitude change signal is then compared with the immediately preceding one. FIG. 3B shows a graph corresponding to that shown in FIG. 2B. It will be apparent that, over regions 24, 26 and 28, the signal is fluctuating between peaks whose magnitude difference is very small. Therefore, the corresponding plots on FIG. 3B will be clustered around the origin 0/0 —and are not illustrated in FIG. 3B. When the waveform undergoes the transition from region 24 to region 26, there will be a large change, shown at 29A, and the corresponding plot is shown at C in FIG. 3B. Similarly, there will be a large change, 29B, when the waveform switches from region 26 to region 28, and the corresponding plot is shown at point D. It will therefore be apparent that, with a waveform of the form shown in FIG. 3B, the plots on the graph will either be clustered around the origin or will be close to the horizontal or vertical axes.

FIG. 4A shows the waveform of the signal on line 14 when the infra-red radiation received is from a flame. As will be apparent, the waveform is significantly random. As before, the processing unit 16 detects each positive and negative peak and measures the value of the magnitude change between each peak and the preceding one and then compares successive values of these magnitude change signals, such as the magnitude change signals shown at 30A, 30B, 30C, 30D...

FIG. 4B shows some of the corresponding points on a graph of the same form as that shown in FIGS. 2B and 3B. Thus, point E is the plot produced by comparing the magnitude change signal 30B with the magnitude change signal 30A. At point F is shown the plot produced by comparing the magnitude change signal 30C with the magnitude change signal 30B. Because of the nature of the waveform of FIG. 4A, which varies much more randomly than the waveforms shown in FIGS. 2A and 3A, the corresponding points on the graph of FIG. 4B will tend to be positioned away from the diagonal line B and also away from the horizontal and vertical axes.

The processing unit therefore analyses the incoming waveform on line 14 and, for a fixed number of events (where each event consists of a comparison of the value of a magnitude change signal with the value of the immediately preceding magnitude change signal), determines the respective proportions of the number of events which produce (a) plots either on the diagonal B (FIGS. 2B, 3B and 4B) or close to the horizontal and vertical axes, and (b) plots which are spaced from the diagonal and from the axes. For example, the analysis could be carried out by assigning a negative "score" (e.g. −1) to each event producing a plot on the diagonal B or adjacent to the horizontal and vertical axes, and assigning a positive score (e.g. +1) to each event which produces a plot (corresponding to plots E and F, for example) spaced from the diagonal and spaced from the horizontal an vertical axes. After a predetermined number of events, the negative total is subtracted from the positive total to give a resultant number. A more positive number will indicate that the signal being compared corresponds to radiation from a flame, whereas a more negative number will indicate that the signal corresponds to radiation produced from an interfering source such as one producing waveform 2A or 3A. Numerical limits can be incorporated into the processing. Thus, for example, processing unit 16 may be arranged to produce a flame warning signal on line 18 only when the number produced by subtracting X from Y is more positive than a fixed threshold.

In practice, of course, sources of interfering radiation of the form shown in FIG. 2A will not always produce plots exactly on diagonal B. Therefore, all plots lying within a region whose boundaries lie either side of the diagonal B (as shown by the dotted lines adjacent to the diagonal B) would be considered as representing radiation from interfering sources of the type producing waveform A. Similarly, all points lying within defined regions running parallel to the horizontal and vertical axes would be considered as being derived from interfering radiation of the type producing waveform 3A.

It will be noted that no account is taken of the sign of the magnitude change signals, merely their actual magnitude values.

The program for controlling the processing unit 16 and the thresholds used in the assessment and decision processes may be stored in the ROM 70 (FIG. 1).

The number of events necessary for the processing unit 16 to make a decision can be arranged on a "rolling" basis. For example, the unit 16 can make its decision on the basis of a consideration of the immediately preceding twenty events, each new event occurring then being considered in combination with the immediately preceding nineteen events.

It is also desirable that an assessment be made of the intensity of the radiation so that a warning is only given when (a) the radiation is determined (in the manner described) to originate from a flame and (b) its intensity exceeds a minimum level. The latter may be achieved by adding the magnitude of each magnitude change signal to those of the preceding nineteen on a rolling basis.

Figure 5:
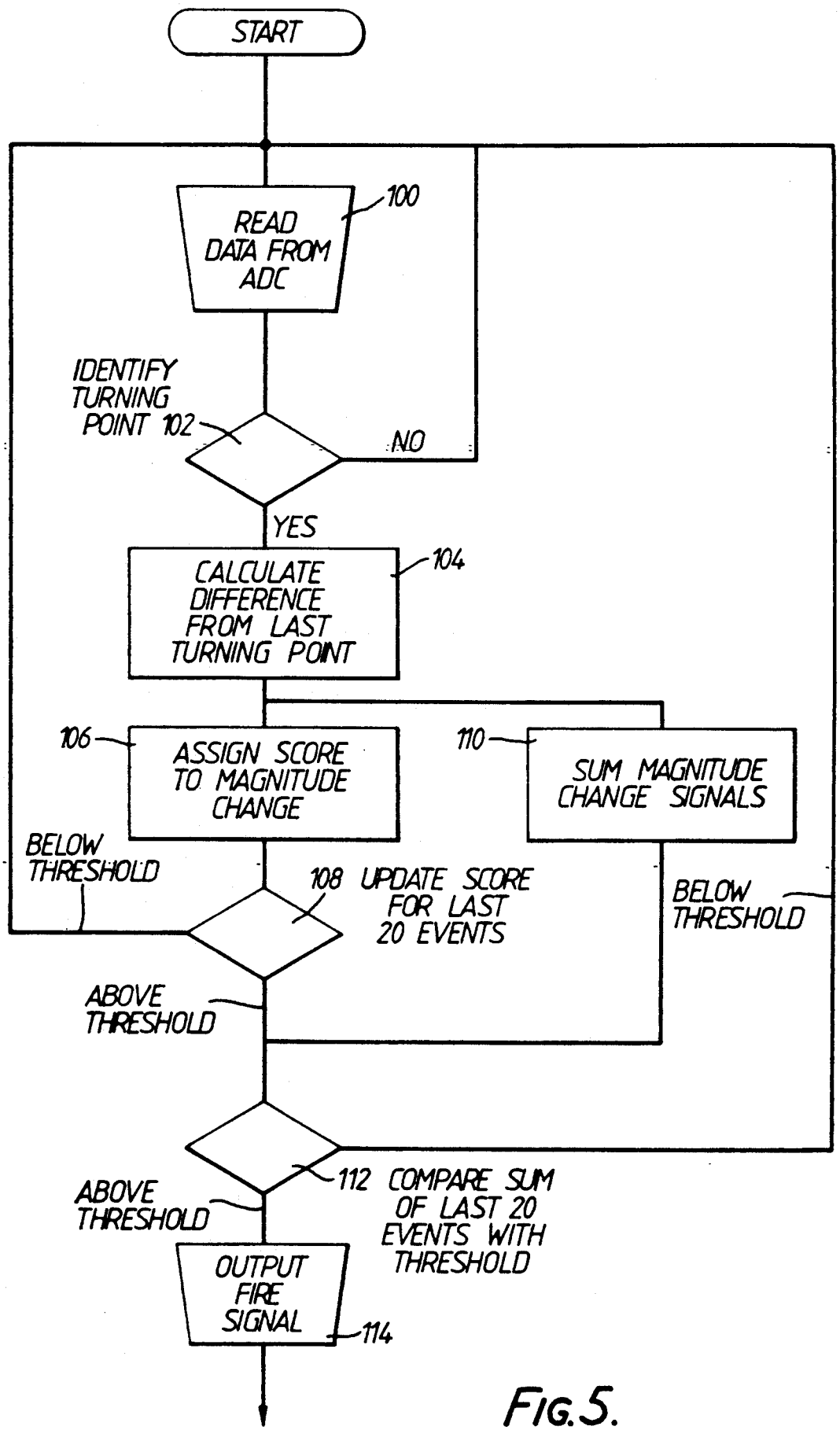
FIG. 5 is a schematic flow diagram for explaining the operation of the apparatus.

FIG. 5 shows a flow chart for explaining such processes in more detail.

Block 100 represents the process of reading the data from the analog to digital converter which may, for example, be carried out by sampling the received digital representation at intervals substantially less than the period of waveforms likely to be received. At block 102, the process checks each sample and compares its magnitude with the previous sample so as to determine whether a turning point has been reached. If it has, the difference from the previous turning point is calculated at block 104 and compared with the previous difference in block 106, a score being assigned according to the notional position of the event on the graph shown in FIGS. 2 to 4; for example each event of the type shown in FIG. 4 could be assigned a score of +1 and each event of the type shown in FIG. 2 or FIG. 3 could be assigned a score of −1. In practice, however, better discrimination may be achieved by assigning each event of the type shown in FIG. 4 a more positive score such as +10. Block 108 represents the comparison process by which the current score is added to the previous 19 (for example) scores, and the result compared with a threshold. Block 110 represents the summing of the magnitudes of the differences between successive events (the magnitude change signals) and at 112 the magnitude for the current event is summed with the total for the nineteen previous events and the resultant checked to determine whether it exceeds a predetermined minimum. Block 114 represents the production of the fire warning signal if "yes" outputs are produced by both blocks 108 and 112. An alternative method of assessing the magnitude of the radiation is to integrate the digital signal received from the analog to digital converter over a fixed time period.

The system described above may be used as part of a system for discriminating against interfering sources of radiation. For example, the system shown in FIG. 1 could form one channel of a two-channel system. The second channel would be driven by a radiation detector rendered responsive to radiation in a different wavelength band from that of the channel illustrated, such as in another band in which radiation from the flames is expected to lie or another band in which interfering radiation is expected to lie. In the first case, the flame warning signal on line 18 could then be processed in combination with the output of the second channel so as to produce an overall flame warning only when the signal on line 18 is present and when both channels detected flame. In the second case, the signal on line 18 could be produced with the signal from the second channel so that an overall flame warning would only be produced when the signal on line 18 was present and no signal was present from the second channel.

What is claimed is:

1. A system for processing signals so as to discriminate in favor of certain types of signal and against other types, comprising
    means for identifying successive turning points of a signal,
    means for measuring the changes in magnitude between said successive turning points of the signal,
    comparing means for comparing each such magnitude change with the immediately preceding such magnitude change, and
    processing means responsive to the successive comparisons to discriminate against those produced when the signal is substantially regularly varying or includes changes which are substantially of step form, and in favor of those corresponding to a substantially randomly varying signal.

2. A system according to claim 1, wherein the processing means further comprises means for making a predetermined number of successive comparisons and means for determining the proportion thereof corresponding to substantially regularly varying signals or signals which are substantially of step form, and the proportion thereof corresponding to substantially randomly varying signals, and including means for producing a warning output when the latter proportion exceeds a predetermined threshold.

3. A system according to claim 1, in which said certain types of signal are signals derived from infra-red radiation produced by flames, and said other types of signal are signals derived from interfering sources of infra-red radiation.

4. A system according to claim 3, including intensity-responsive means for assessing the intensity of the radiation so as to discriminate against radiation whose intensity is lower than a predetermined threshold.

5. A system according to claim 4, in which the intensity-responsive means comprises means for summing said magnitude change.

6. A method of monitoring a source of radiation and discriminating in favor of infra-red radiation from flames and against infra-red radiation from interfering sources, comprising the steps of
    producing signals varying in correspondence with said monitored radiation,
    detecting the turning points of the signals,
    measuring the change in signal magnitude between successive said turning points whereby to produce a series of magnitude change signals,
    simulating the spatial representation of successive points on a graph having two orthogonal axes each of which is scaled with values increasing from zero for the said magnitude changes with one of the axes representing each currently considered magnitude change and the other of them representing the corresponding immediately preceding magnitude change so that each said point on the graph represents a plot of a particular one of the magnitude changes between the currently considered magnitude as compared with the immediately preceding one thereof,
    whereby points on the graph corresponding to substantially regularly varying signals lie within a predetermined region extending from the origin and inclined to each said axis, points on the graph corresponding to substantially step changes in said signals lie within either of two regions extending closely adjacent the respective axes, and points corresponding to substantially randomly varying signals tend to lie outside all said regions, and
    including the step of determining the proportion of said points which lie outside said regions whereby to produce an output indicating detection of radiation from flames when said proportion exceeds a predetermined threshold.

7. A method according to claim 6, including the step of blocking the production of said output signal unless, for a predetermined number of said points, the sum of the corresponding magnitude changes exceeds a predetermined value.

* * * * *

UNITED STATES PATENT AND TRADEMARK OFFICE
CERTIFICATE OF CORRECTION

PATENT NO.   : 5,006,710
DATED        : April 9, 1991
INVENTOR(S)  : Brian D. Powell It is certified that error appears in the above-identified patent and that said Letters Patent is hereby corrected as shown below:

Title page, item [30], insert:

-- Foreign Application Priority Data

October 12, 1988        Great Britain        8823947 --.

Signed and Sealed this

Twenty-second Day of June, 1993

Attest:

MICHAEL K. KIRK

Attesting Officer          Acting Commissioner of Patents and Trademarks